(12) United States Patent
King et al.

(10) Patent No.: US 6,174,130 B1
(45) Date of Patent: Jan. 16, 2001

(54) MOVABLE SHAFT ASSEMBLY

(75) Inventors: Aaron H. King, Cincinnati; Andrew J. Lammas, Maineville; John D. Connelly, Cincinnati, all of OH (US)

(73) Assignee: General Electric Company, Cincinnati, OH (US)

( * ) Notice: Under 35 U.S.C. 154(b), the term of this patent shall be extended for 0 days.

(21) Appl. No.: 09/345,191

(22) Filed: Jun. 30, 1999

(51) Int. Cl.⁷ .................................... F01D 17/12
(52) U.S. Cl. ............................ 415/162; 464/183
(58) Field of Search .................... 415/148, 150, 415/159, 160, 161, 162; 464/179, 183; 403/79, 157

(56) References Cited

U.S. PATENT DOCUMENTS

| | | |
|---|---|---|
| 2,858,062 | 10/1958 | Allen . |
| 2,933,234 | 4/1960 | Neumann . |
| 2,933,235 | 4/1960 | Neumann . |
| 3,779,665 * | 12/1973 | Tatem, Jr. et al. .................... 415/123 |
| 4,292,802 * | 10/1981 | Snow ..................................... 60/204 |
| 5,281,087 | 1/1994 | Hines ................................... 415/160 |
| 5,308,226 | 5/1994 | Venkatasubba et al. ............. 415/160 |
| 5,492,446 | 2/1996 | Hawkins et al. ..................... 415/160 |
| 5,807,072 | 9/1998 | Payling ............................. 415/170.1 |

* cited by examiner

*Primary Examiner*—Edward K. Look
*Assistant Examiner*—Liam McDowell
(74) *Attorney, Agent, or Firm*—Andrew C. Hess; William Scott Andes

(57) ABSTRACT

A shaft assembly for movement of an array of adjustable members comprises a hollow shaft body including a shaft body wall with a wall outer surface. A plurality of spaced apart clevises, secured with the shaft body wall on the wall outer surface, each includes connection means disposed away from the wall outer surface for connection with an actuator for movement of the adjustable members.

10 Claims, 3 Drawing Sheets

MOVABLE SHAFT ASSEMBLY

BACKGROUND OF THE INVENTION

This invention relates to movable shaft assemblies for movement of an array of adjustable members. More particularly. it relates to torque shaft assemblies in power generating apparatus such as gas turbine engines.

Turbine engines with variable airfoil capability, for example variable compressor stator vanes, frequently include a torque shaft assembly associated with an actuator. Such an assembly enables and coordinates movement of a plurality of stages of stator vanes responsive to controlled, changing engine conditions. Examples of gas turbine engines including axial flow compressors having variable stator mechanisms is shown in U.S. Pat. Nos. 2,858,062—Allen (patented Oct. 28, 1958) and 2,933,235—Neumann (patented Apr. 19, 1960).

Currently used torque shaft assemblies, as well as those shown in the above identified patents, include solid metal shafts into which generally are provided recesses, slots, indentations, etc., within the outer surface of the shaft to receive or provide connection with other assembly parts, for example turnbuckles. Because torque shafts can be subject to undesirable flexural (flex) action resulting from engine vibration, some gas turbine engine solid shafts have been provided with a generally central mount, in addition to end mounts, to restrict such undesirable motion of the shaft. However, in the design of some turbine engines, it has not been practical to provide such a central mount, and solid torque shafts with only end mounts have been used. It has been found that premature wear has been observed with such end-mounted torque shafts, sometimes in a very short period of time. For example, such wear has occurred on forward shaft journals and on aft spherical bearings. Means to restrict or change the occurrence of undesirable motion of such end-mounted shafts to avoid premature wear would reduce the need for early repair or replacement of torque shafts.

BRIEF SUMMARY OF THE INVENTION

The present invention. in one form, provides a shaft assembly for movement of an array of adjustable members comprising a hollow shaft body. A plurality of spaced-apart devises is secured with the shaft body wall on the wall outer surface. Each clevis includes connection means disposed away from the wall outer surface for connection with an actuator for movement of the array of adjustable members.

DETAILED DESCRIPTION OF THE INVENTION

Figure 1:
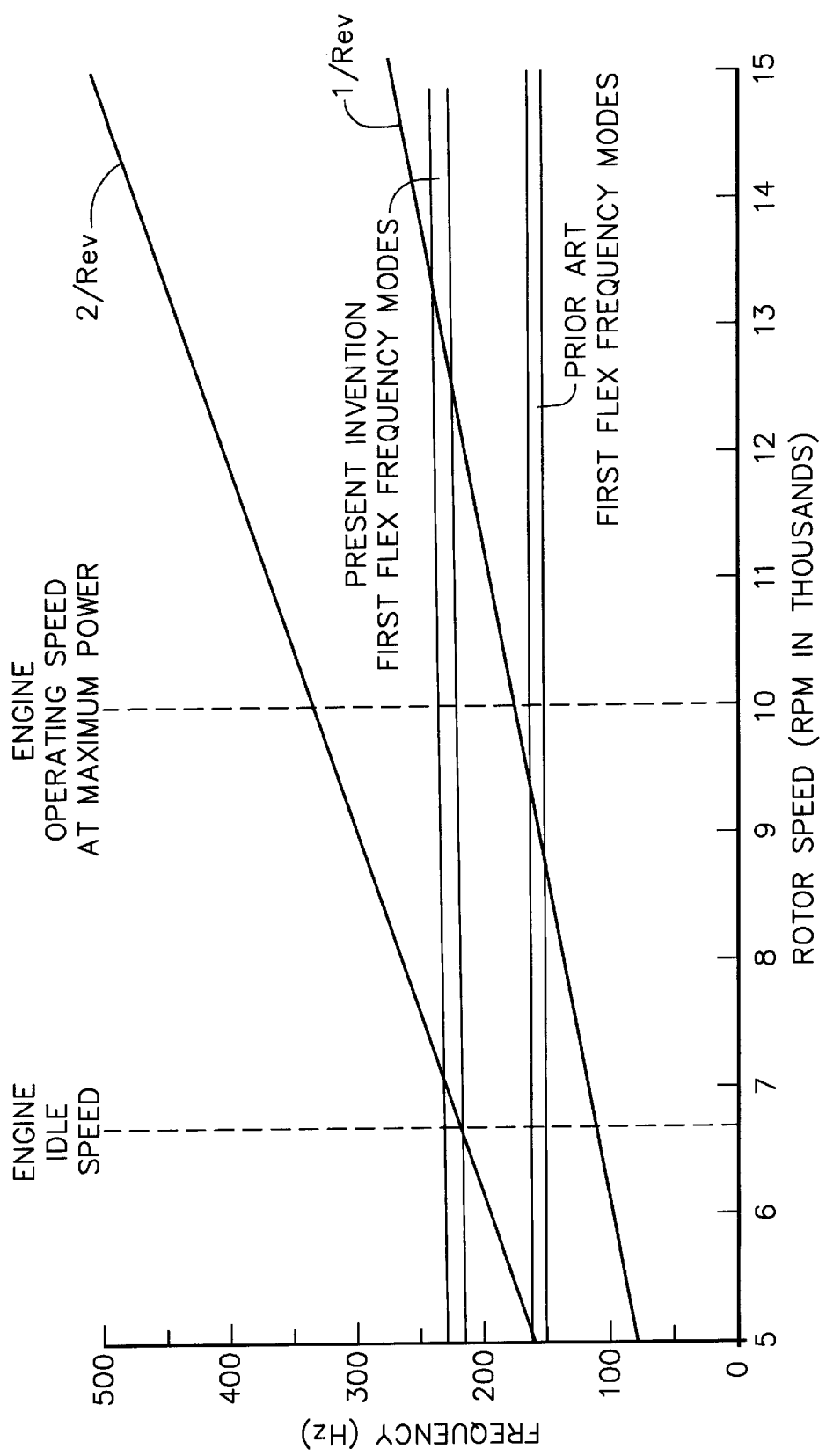
FIG. 1 is a graph comparing first flexural modes of a prior art solid shaft with a tube form of the hollow shaft body of the present invention.

Wear on one form of the current solid shaft in a gas turbine engine torque shaft assembly for an axial flow compressor variable stator vane assembly has been found to occur due to first flex natural frequencies of the solid shaft being driven in an engine operating range at high speed. These modes are driven by the inherent one per revolution (1/rev) balance condition of the compressor rotor. The graph of FIG. 1 shows the current, prior art solid shaft first flex frequencies for one type of axial flow gas turbine engine crossing the 1/rev line very close to the operating speed of the engine at maximum power. Since this is the speed where the engine spends nearly all of its operating time. the solid shaft becomes excited and the force of its vibration causes relatively rapid wear of the solid shaft and/or its associated members.

As a result of use of the hollow shaft in the assembly of the present invention, the 1/rev line crossing was moved well above the maximum engine operating speed for that engine. At the same time, the 2/rev crossing of the first flex frequency modes was maintained at or below engine idle speed. With a hollow shaft assembly design according to the present invention, there is flexibility not present with the solid shaft design to obtain higher natural frequencies and to enable tuning of the shaft frequency within the constraints of the engine mounting points and envelope available.

As an example of this benefit of the present invention, in the design represented by the data of FIG. 1 for a hollow tubular shaft body, the largest shaft outside diameter that could be used within the available envelope was selected. This was to maximize torsional and bending stiffness of the hollow tubular shaft under actuation loads and to give the highest potential natural frequency that could later be tuned to give a desired frequency. In this example of the present invention to select the outside diameter, the centerline or axis of the hollow shaft body was moved so that all attachment points to associated actuator assembly members were outside of the shaft body and away from the hollow shaft surface. This was done to ensure that the integrity and stiffness of the hollow shaft, in this case a tube, was maintained to maximize frequency. This is in contrast with the assembly using the prior art solid shaft in which at least a part of the attachment points are within the outside diameter of the solid shaft, for example at indentations or portions machined into the solid shaft. This prior arrangement dramatically reduced the shaft's frequency.

In this example of the present invention, with the selected outside diameter, different hollow shaft wall thickness were evaluated to select a desired frequency for the particular engine design. The objective was to move the 1/rev crossing as high as possible keeping the 2/rev crossing at or below the engine idle speed, generally as discussed above in connection with FIG. 1.

Figure 2:
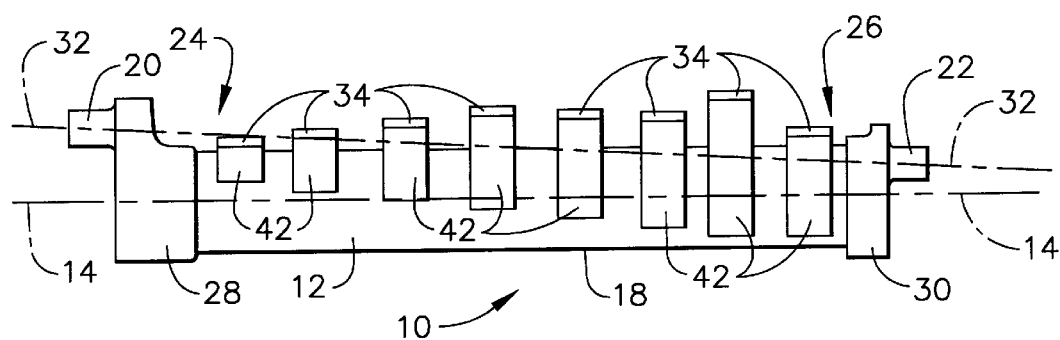
FIG. 2 is a diagrammatic side view of a hollow torque shaft assembly according to one embodiment of the present invention.

The present invention will be more fully understood with reference to figures of the drawing. FIG. 2 is a diagrammatic side view of a movable hollow torque shaft assembly, shown generally at 10, according to one embodiment of the present invention. The assembly comprises a hollow shaft body 12, shown in this example in the form of a metal tube with a substantially continuous body wall 16 and body wall outer surface 18 (FIGS. 5 and 6), for example to maintain structural integrity. Shaft body 12 has a shaft body axis 14. A pair of spaced apart end shafts 20 and 22, shown as solid metal members, are secured with the body: end shaft 20 is secured with shaft body first end portion 24 and end shaft 22 is secured with shaft body second end portion 26. In the embodiment shown, the solid metal end shafts, of substantially circular cross section, are secured with the shaft body using end caps 28 and 30, as shown. At least one of the end shafts, 20 in FIG. 2, is disposed off set from the shaft body axis 14, along an end shaft axis 32 that is disposed at an angle to the body axis 14. This divergence of axes enables all of the attachment points to associated actuator assembly members, for example through commonly used turnbuckles, to be outside of the shaft body outer surface. This ensures that the integrity and stiffness of the hollow shaft body is maintained in order to maximize frequency. In addition, the amount of off set of the axes can be used to adjust the amount of movement of such associated members, for example, turmbuckles.

Figure 3:
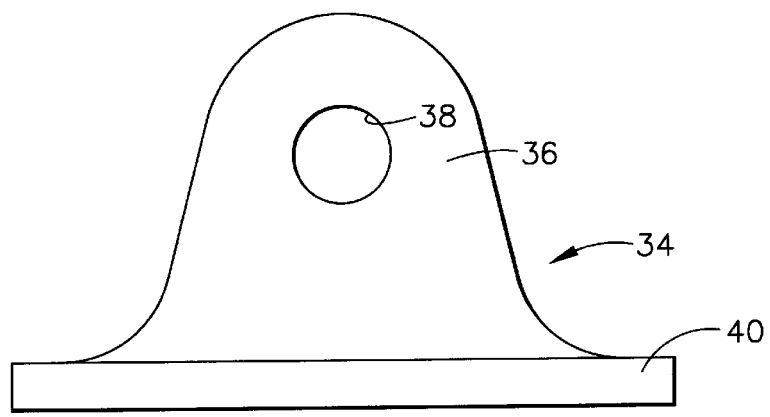
FIG. 3 is a side view of a clevis.
Figure 4:
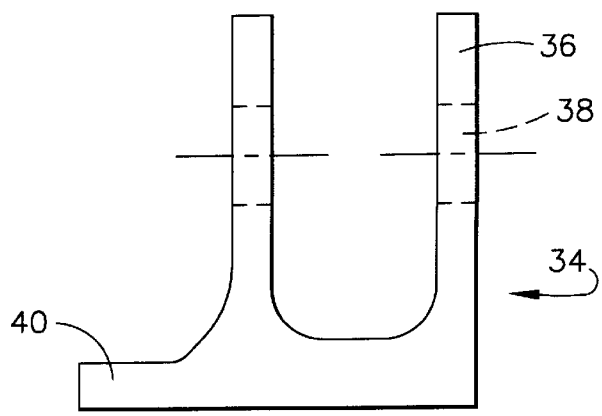
FIG. 4 is an end view of the clevis of FIG. 3.
Figure 5:
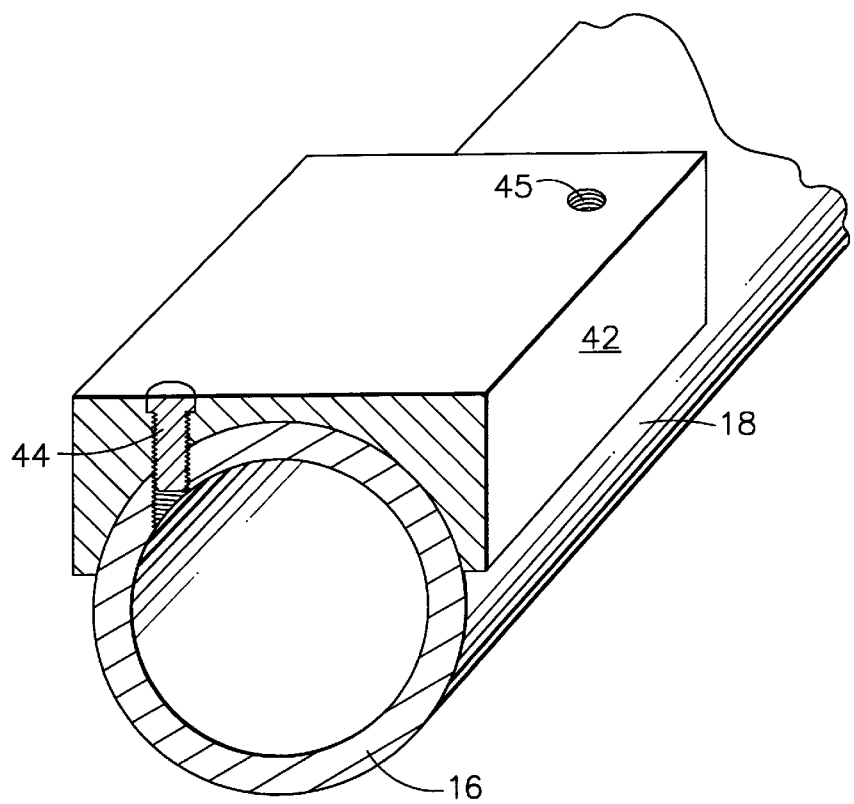
FIG. 5 is a fragmentary, sectional view of the hollow shaft of FIG. 2 with a saddle bolted to the shaft wall as a means for securing the clevis to the shaft wall.
Figure 6:
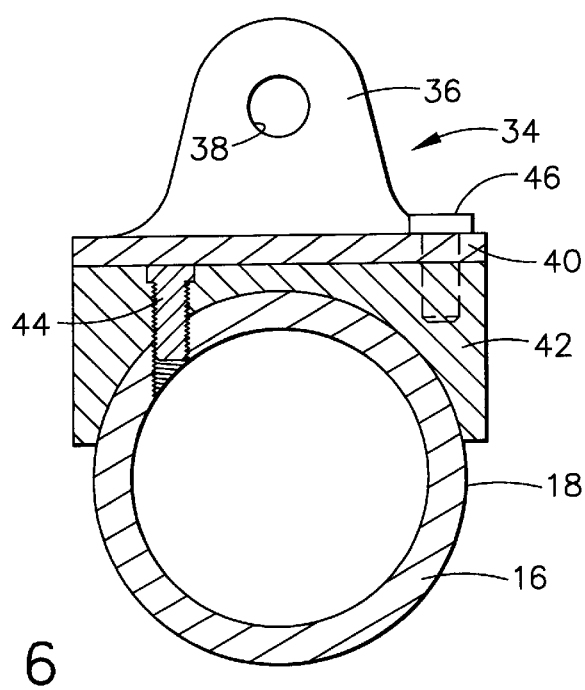
FIG. 6 is a sectional view of the members in FIG. 5 with the clevis of FIG. 3 secured to the shaft wall using the saddle.

As shown in FIG. 2, each of a plurality of spaced-apart metal devises 34, shown in more detail in FIGS. 3, 4 and 6, is secured with the body wall 16 on a portion of the wall outer surface 18. Each clevis 34 includes means for connection with an actuator (not shown) for movement of an array of adjustable members. Examples of actuators and an array of adjustable members in the form of compressor variable stator vanes are shown in the above-identified Allen and Neumann patents. In the embodiment of FIG. 2, at least one, and in that example a plurality, of the devises are positioned with their means for connection with an associated actuator at different distances away from and outside of shaft body wall outer surface 18, as needed for programmed, controlled or coordinated movement of the array. Such different distances are provided by varying the size of an intermediate adapter 42, shown in more detail in FIGS. 5 and 6.

In the embodiment of the clevis in FIGS. 3, 4 and 6, clevis 34 includes a clevis web 36 having there through a clevis eyelet 38, for example to receive a bolt of a turnbuckle, as means for connection with an actuator. Clevis 34 in the drawings is shown to have a metal clevis base 40. Base 40 can be shaped to match the shape of shaft body wall outer surface 18 or, as shown, is shaped to cooperate with the intermediate adapter, such as a metal adapter saddle 42, FIGS. 5 and 6, for securing of the clevis to the wall outer surface 18 of shaft body wall 16.

Use of a fixed shape clevis with a size-variable adapter, such as a saddle, secured with the wall outer surface enables ease of variation or adjustment of the distance of the clevis from the shaft body to each actuator by varying the size of the saddle. Such distance depends on designed, programmed movement of stages of the array of members, for example variable stator vanes. In addition, use of different size adapters allows manufacture of the hollow shaft assembly of the present invention to replace prior art solid shaft assemblies without change in the design or operation of other, associated members. One convenient means for securing the adapter as saddle 42 to the shaft body wall 16 is through threaded bolts 44 and threaded hole. However, other joining or attachment means, including bonding, welding, brazing, etc., can be used, taking into consideration such factors as the relative coefficient of thermal expansion of the members to be joined to avoid separation or cracking upon thermal cycling.

As shown in the sectional view of FIG. 6, base 40 of a clevis 34 is secured to the arrangement of FIG. 5, with saddle 42 bolted through threaded bolt 44 to shaft body wall 16 on a portion of outer wall surface 18. In this embodiment, the clevis can be secured by any convenient means, including through one or more threaded bolts 46, as shown in FIG. 6, by or welding, taking into consideration the above-mentioned factors, etc. In the example of FIG. 6, means to secure the clevis to the shaft body wall includes saddle 42.

The present invention has been described in connection with specific examples, embodiments, materials, etc. However, it should be understood that they are intended to be representative of, rather than in any way limiting on, its scope. Those skilled in the various arts involved will understand that the invention is capable of variations and modifications without departing from the scope of the appended claims.

What is claimed is:

1. A shaft assembly for movement of an array of adjustable members comprising:
    a hollow shaft body including a shaft body wall having a wall outer surface; and,
    a plurality of spaced apart devises secured with the shaft body wall on the wall outer surface, each clevis including connection means disposed at a distance away from the wall outer surface for connection with an actuator for movement of the adjustable members.

2. The shaft assembly of claim 1 in which the distance that at least one of the connection means of the devises is disposed away from the wall outer surface is different than the distances of the connection means of other of the clevises.

3. The shaft assembly of claim 1 in which:
    the hollow shaft body is a metal tube with a substantially continuous outer surface; and,
    each clevis is secured with the shaft body wall through an adapter secured between each clevis and a portion of the shaft body wall.

4. The shaft assembly of claim 3 in which the connection means for a plurality of devises is disposed at different distances away from the wall outer surface as a result of variation in the sizes of the adapters.

5. The shaft assembly of claim 4 in which the adapter is a metal saddle.

6. A shaft assembly for movement of an array of adjustable members comprising:
    a hollow shaft body having a shaft body axis and including first and second shaft body end portions and a shaft body wall having a wall outer surface;
    a pair of spaced apart end shafts, one secured with the body first end portion and the other secured with the body second end portion, at least one of the end shafts disposed off set from the shaft body axis along an end shaft axis, the end shaft axis being disposed at an angle to the shaft body axis; and,
    a plurality of spaced apart devises secured with the shaft body wall on the wall outer surface, each clevis including means for connection with an actuator for movement of the adjustable members.

7. The shaft assembly of claim 6 in which:
    the hollow shaft body is a metal tube with a substantially continuous outer surface;
    the end shafts are solid metal shafts of substantially circular cross section; and,
    each clevis is secured with the shaft body wall through an adapter secured between each clevis and a portion of the shaft body wall.

8. The shaft assembly of claim 7 in which the adapter is a metal saddle.

9. In a gas turbine engine comprising a stator vane assembly including a plurality of stages of adjustable stator vanes, and actuator means connected with a torque shaft assembly for movement of the adjustable stator vanes, wherein the torque shaft assembly comprises:
    a hollow torque shaft body having a shaft body axis and including first and second shaft body end portions and a shaft body wall having a wall outer surface;

a pair of spaced apart end shafts, one secured with the body first end portion and the other secured with the body second end portion, at least one of the end shafts disposed off set from the shaft body axis along an end shaft axis, the end shaft axis being disposed at an angle to the shaft body axis; and, a plurality of spaced apart devises secured with the shaft body wall on the wall outer surface, each clevis including connection means disposed at a distance assay from the wall outer surface for connection with the actuator means for movement of the adjustable stator vanes, the distance that at least one of the connection means of the devises is disposed away from the wall outer surface being different than the distances of the connection means of other of the clevises.

10. The torque shaft assembly of claim 9 in which:

the hollow shaft body is a metal tube with a substantially continuous outer surface;

the end shafts are solid metal shafts of substantially circular cross section; and, each clevis is secured with the shaft body wall through a metal saddle adapter secured between each clevis and a portion of the shaft body wall, the connection means for a plurality of devises being disposed at different distances away from the wall outer surface as a result of variation in the size of the saddle.

* * * * *